United States Patent
Kim et al.

(10) Patent No.: US 12,360,029 B2
(45) Date of Patent: Jul. 15, 2025

(54) SYSTEM AND METHOD FOR EVALUATING DISSOLUTION QUALITY OF BINDER SOLUTION FOR SECONDARY BATTERY ELECTRODE, AND METHOD OF MANUFACTURING ELECTRODE SLURRY FOR SECONDARY BATTERY

(71) Applicant: LG ENERGY SOLUTION, LTD., Seoul (KR)

(72) Inventors: Young Seok Kim, Daejeon (KR); Joo Yong Park, Daejeon (KR); Sung Soo Yoon, Daejeon (KR); Je Gwon Lee, Daejeon (KR); Hye Jin Sim, Daejeon (KR); Hyeon Jeong Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 273 days.

(21) Appl. No.: 17/922,334

(22) PCT Filed: Mar. 21, 2022

(86) PCT No.: PCT/KR2022/003877
§ 371 (c)(1),
(2) Date: Oct. 28, 2022

(87) PCT Pub. No.: WO2022/211338
PCT Pub. Date: Oct. 6, 2022

(65) Prior Publication Data
US 2023/0175943 A1    Jun. 8, 2023

(30) Foreign Application Priority Data

Mar. 30, 2021 (KR) .................. 10-2021-0041337
Mar. 30, 2021 (KR) .................. 10-2021-0041343

(51) Int. Cl.
*G01N 13/00* (2006.01)
*G01N 11/04* (2006.01)
(Continued)

(52) U.S. Cl.
CPC ............. *G01N 13/00* (2013.01); *G01N 11/04* (2013.01); *H01M 4/0416* (2013.01); *H01M 4/623* (2013.01); *G01N 2013/006* (2013.01)

(58) Field of Classification Search
CPC .. G01N 13/00; G01N 11/04; G01N 2013/006; G01N 5/04; H01M 4/0416;
(Continued)

(56) References Cited

U.S. PATENT DOCUMENTS 5,916,628 A * 6/1999 Ueyama ............. H01M 4/0414
29/623.5
2005/0095729 A1    5/2005 Hanamoto et al.
(Continued)

FOREIGN PATENT DOCUMENTS

CN    105140522 A    12/2015
JP    H06-221979 A    8/1994
(Continued)

OTHER PUBLICATIONS

International Search Report (with partial translation) and Written Opinion dated Jun. 24, 2022 issued in corresponding International Patent Application No. PCT/KR2022/003877.
(Continued)

*Primary Examiner* — Xin Y Zhong
(74) *Attorney, Agent, or Firm* — Morgan, Lewis & Bockius LLP

(57) ABSTRACT

According to a system and method for evaluating the dissolution quality of a binder solution for a secondary battery electrode, by preparing an electrode slurry with a binder solution having a predetermined amount or more of
(Continued)

cumulative filtration amount or a predetermined level or less of flow rate reduction rate, the quality of an electrode for a secondary battery may be improved.

20 Claims, 5 Drawing Sheets

(51) Int. Cl.
  *H01M 4/04* (2006.01)
  *H01M 4/62* (2006.01)
(58) Field of Classification Search
  CPC .......... H01M 4/623; H01M 4/02; H01M 4/04; H01M 4/0404; H01M 4/139; H01M 4/62; H01M 10/0525; B01D 37/043; B01D 35/02; G01G 11/00; G01G 17/04; Y02E 60/10
  See application file for complete search history.

(56) References Cited

U.S. PATENT DOCUMENTS

| | | |
|---|---|---|
| 2006/0197255 A1 | 9/2006 | Tsujimoto |
| 2011/0229760 A1 | 9/2011 | Hidaka et al. |
| 2014/0080115 A1 | 3/2014 | Reed |
| 2018/0166688 A1 | 6/2018 | Ahn et al. |
| 2019/0027757 A1 | 1/2019 | Inoue |

FOREIGN PATENT DOCUMENTS

| | | |
|---|---|---|
| JP | H08-151401 A | 6/1996 |
| JP | 2005-325342 A | 11/2005 |
| JP | 2012-196590 A | 10/2012 |
| JP | 2014-104401 A | 6/2014 |
| JP | 2014175106 A | 9/2014 |
| JP | 2016-046186 A | 4/2016 |
| JP | 2016-089915 A | 5/2016 |
| JP | WO2017-154776 A1 | 1/2019 |
| KR | 10-2005-0030587 A | 3/2005 |
| KR | 10-2014-0038949 A | 3/2014 |
| KR | 10-2016-0123643 A | 10/2016 |
| KR | 10-2017-0111722 A | 10/2017 |
| KR | 10-1936826 B1 | 1/2019 |
| KR | 20190011963 A | 2/2019 |
| KR | 10-2020-0107594 A | 9/2020 |

OTHER PUBLICATIONS

CN Office Action dated Nov. 27, 2024 issued in Application No. 202280003652.3.

Extended European Search Report dated Jan. 2, 2025 issued in European Patent Application No. 22781458.9. Note: US 2014/0080115 A1 cited therein is already of record.

Office Action dated Apr. 16, 2025 for the corresponding Korean Patent Application No. 10-2021-0041343.

* cited by examiner

[FIG. 1]
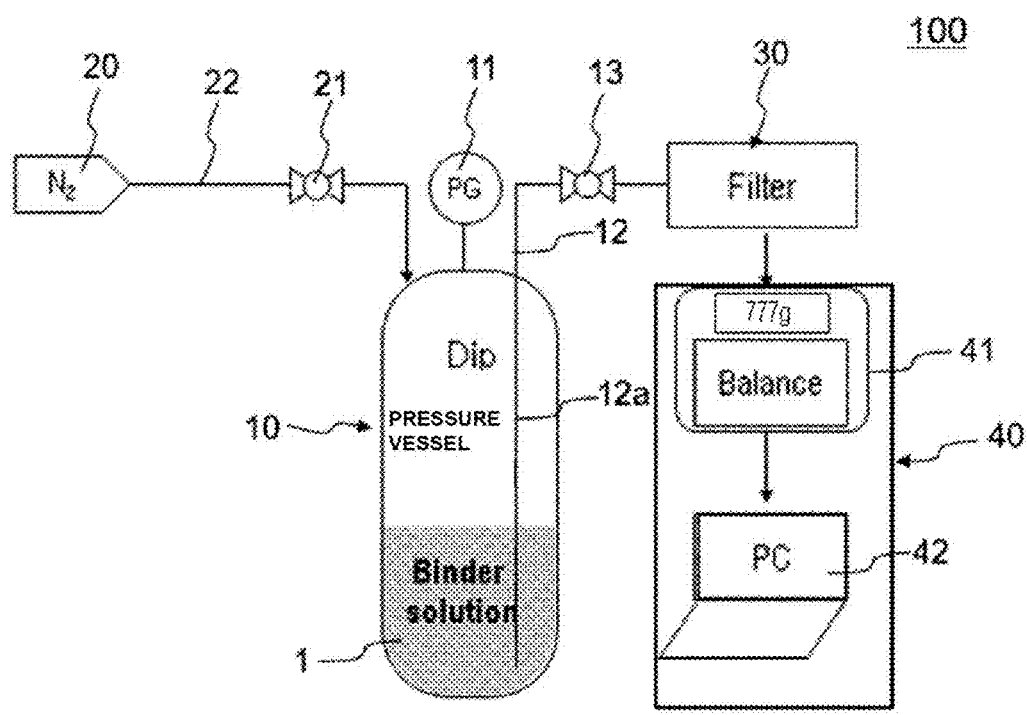

[FIG. 2]
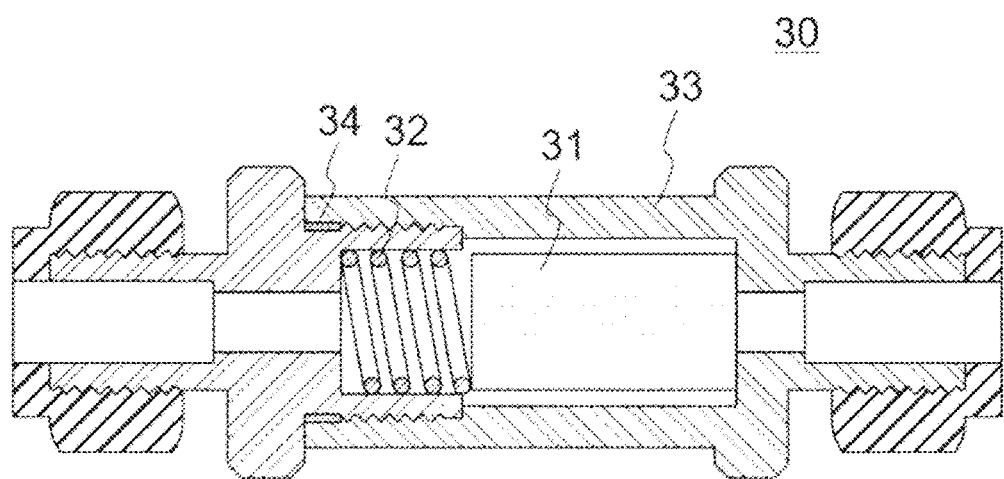

[FIG. 3]
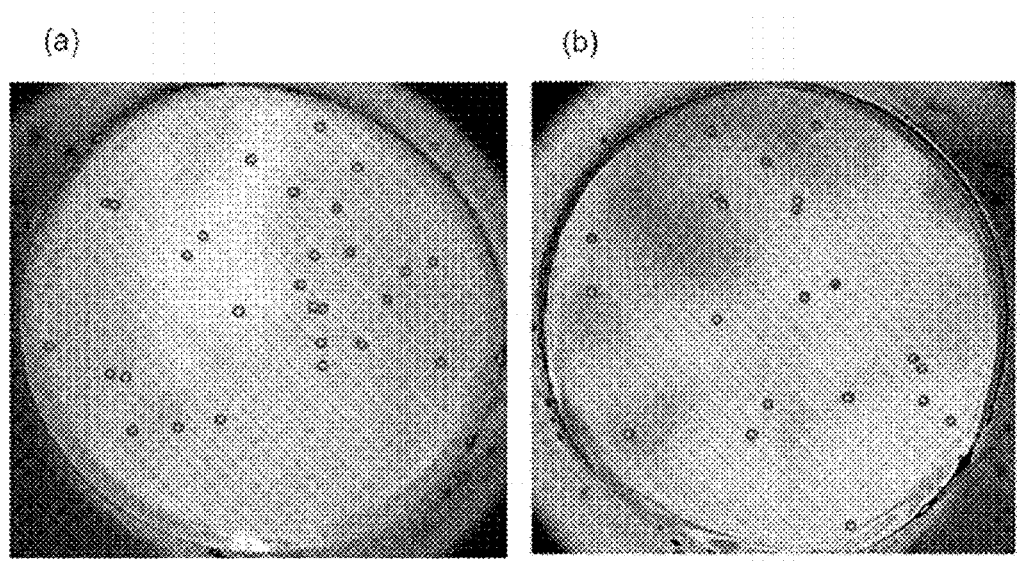

[FIG. 4]
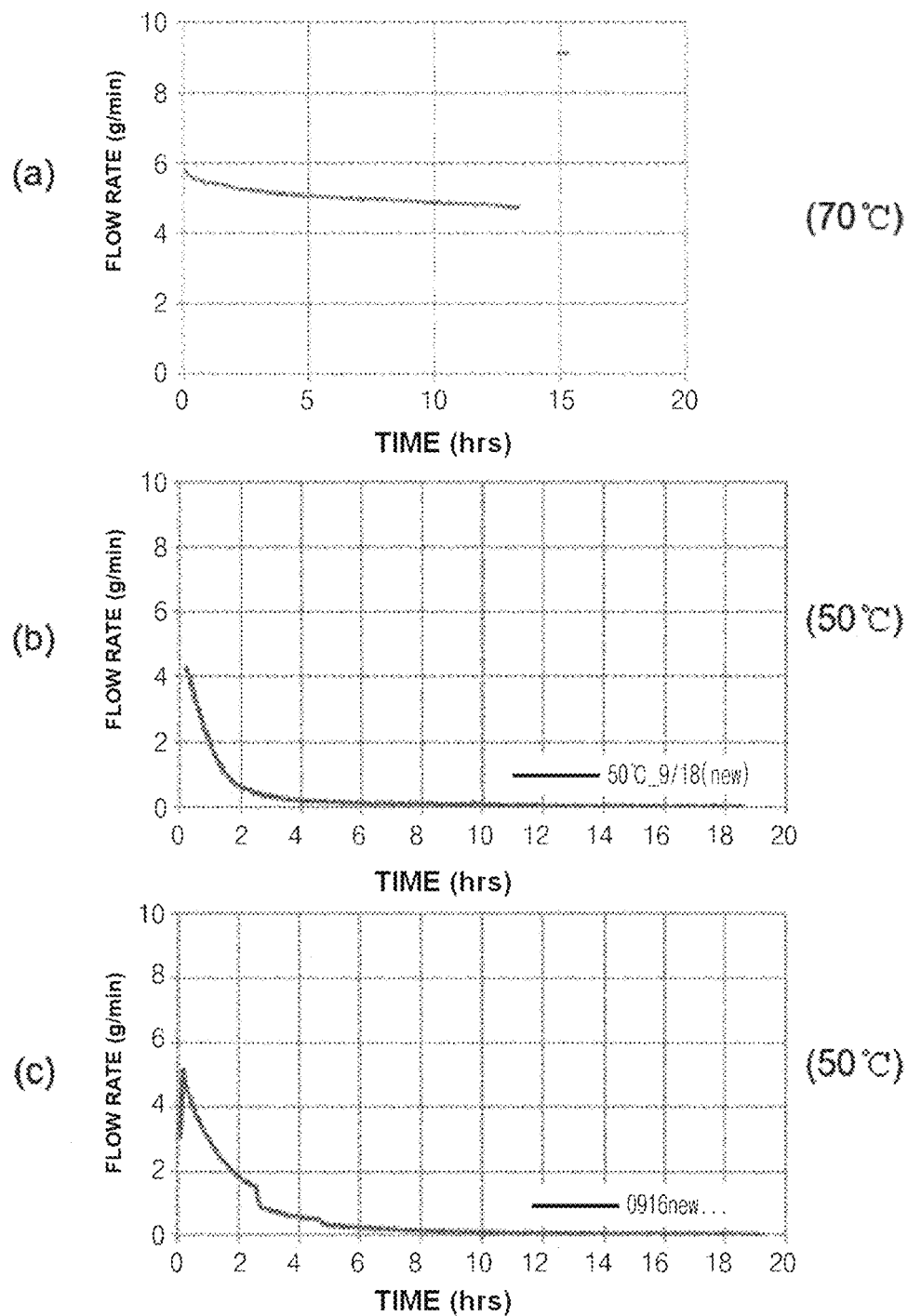

[FIG. 5]
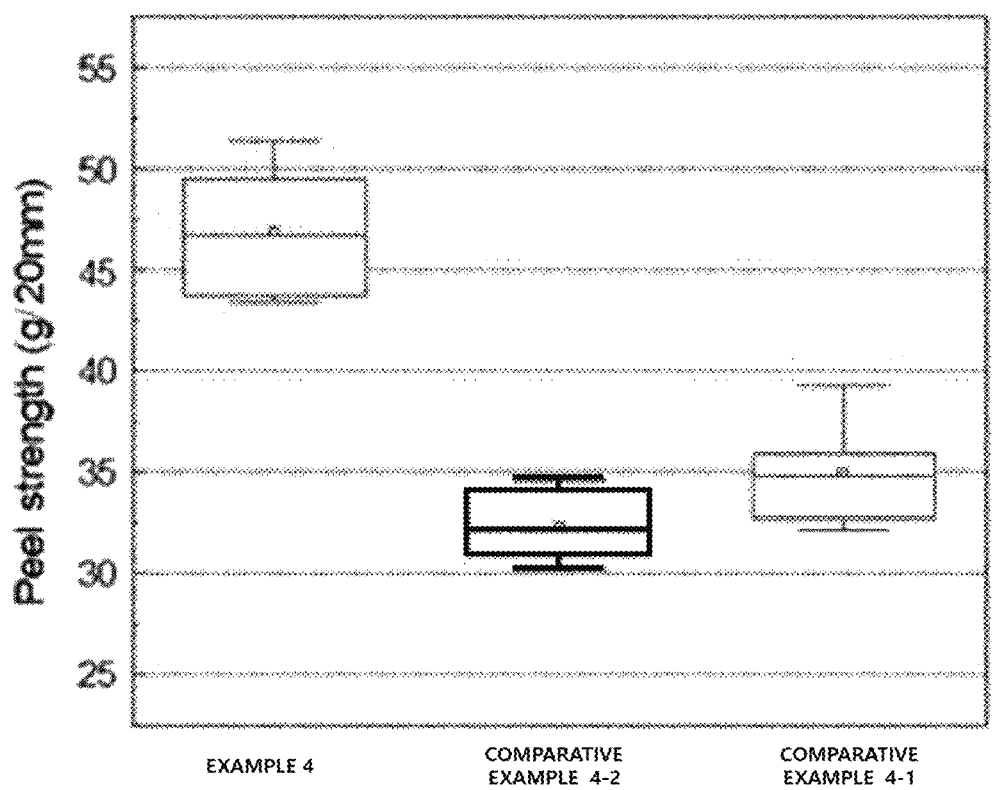

SYSTEM AND METHOD FOR EVALUATING DISSOLUTION QUALITY OF BINDER SOLUTION FOR SECONDARY BATTERY ELECTRODE, AND METHOD OF MANUFACTURING ELECTRODE SLURRY FOR SECONDARY BATTERY

TECHNICAL FIELD

The present invention relates to a system and method for evaluating the quality of a binder solution for a secondary battery electrode. More particularly, the present invention relates to a system and method for evaluating dissolution quality, which can evaluate dissolution quality by quantitatively evaluating parameters indicating a flow rate change of a binder solution over time.

In addition, the present invention relates to a method of manufacturing an electrode slurry for a secondary battery, which can improve the quality of an electrode by applying a binder solution whose dissolution quality has been evaluated.

This application claims priority to and the benefit of Korean Patent Application No. 10-2021-0041337, filed on Mar. 30, 2021, and Korean Patent Application No. 10-2021-0041343, filed on Mar. 30, 2021, the disclosures of which are incorporated herein by reference in their entirety.

BACKGROUND ART

As technology development and demand for mobile, automobile and energy storage devices increase, the demand for batteries as an energy source is rapidly increasing, and among these secondary batteries, lithium secondary batteries have been widely studied, also commercialized and used in various fields.

Electrodes used in lithium secondary batteries are formed by applying a mixture layer containing an active material on an electrode substrate consisting of a metal foil, wherein the mixture layer is formed by applying a positive electrode or negative electrode slurry on an electrode substrate and drying the resulting slurry. Such an electrode slurry is manufactured by mixing a solid content including a positive electrode/negative electrode active material, a conductive material and the like with a binder solution and drying.

A binder serves to attach active materials to each other or an active material with the electrode substrate to improve the adhesive strength of an electrode, and to adjust the viscosity of a slurry. The binder is used in the form of a binder solution dissolved in a predetermined solvent and mixed with an active material, a conductive material and the like, and the dissolution quality of the binder affects the quality characteristics of an electrode slurry or electrode. For example, in the case of the binder with poor dissolution quality such as CMC or PVDF, various problems such as the increased viscosity of a slurry, and electrode coating surface defects may occur. The dissolution quality of the binder depends on how much undissolved materials in the binder solution can be minimized.

Conventionally, to confirm the dissolution quality of the binder solution, a method of simply visually observing a less dissolved binder in the solution, or applying a binder solution on an OHP film using a blade with a predetermined thickness and visually observing the number of impurities on the film was used. In addition, a method of filtering the solution through a nylon mesh filter to count the number of impurities in the filter was applied.

However, the method of observing the number of impurities on the film has a disadvantage in that it is difficult to grasp the total quality of a solution due to a low sample amount, and since external impurities such as dust may enter and are not distinguished from undissolved impurities, measurement accuracy is reduced. In addition, there was a problem such as a large error occurring depending on an evaluator because the evaluation was performed with the naked eye.

In the method of measuring the number of impurities with a mesh filter, impurities derived from the filter itself may be added to the filter. In addition, during the filtration process, air bubbles were generated and impurities were trapped in the bubbles. Moreover, during the filtration, there were cases in which a solute was precipitated in the solution due to water addition and phase-separated from the solvent. Therefore, there was a disadvantage that the reproducibility and accuracy of the dissolution quality evaluation were very low.

As above, when the dissolution quality of the binder solution is not accurately evaluated, although a binder solution in which the same content of binder is dissolved in a solvent is used, the quality of an electrode slurry or electrode for a secondary battery greatly changes according to its dissolution quality.

Therefore, there is a demand for the development of technology that can improve the quality of an electrode by accurately quantitatively evaluating the dissolution quality of the binder solution for producing a secondary battery electrode.

RELATED ART DOCUMENT

Patent Document

Korean Unexamined Patent Application Publication No. 10-2017-0111722

DISCLOSURE

Technical Problem

To solve the above-described problems, the present invention is directed to providing a system for evaluating the dissolution quality of a binder solution for a secondary battery electrode, which can quantitatively evaluate dissolution quality by a cumulative filtration amount and/or a flow rate reduction rate as parameters indicating a change in flow rate of the binder solution over time, and an evaluation method thereof.

In addition, the present invention is directed to providing a method of manufacturing an electrode slurry for a secondary battery, which includes preparing an electrode slurry with a binder solution having a predetermined level or more of cumulative filtration amount or a predetermined level or less of flow rate reduction rate.

Technical Solution

To solve the above problems, one aspect of the present invention provides a system for evaluating a dissolution quality of a binder solution for a secondary battery electrode, which includes a pressure vessel accommodating the binder solution; a pressure medium source supplying a pressure medium at a predetermined pressure to the pressure vessel; a filter connected with the pressure vessel by a pipe; and a flow rate measurement part that measures at least one of a) and b) with respect to the binder solution passing through the filter when the binder solution in the pressure vessel is transferred to the filter and filtered by the pressure medium supplied to the pressure vessel:

a) a cumulative filtration amount for a first period of time; and b) a flow rate reduction rate after a second period of time with respect to an initial flow rate.

In one example, the pipe may extend into the pressure vessel and an end of the pipe may be installed adjacent to a bottom of the pressure vessel.

In one example, the filter may be an in-line filter continuously installed in series with the pipe.

Specifically, the in-line filter includes a filter member, an elastic member that pressurizes the filter member, and a housing accommodating the filter member and the elastic member.

Another aspect of the present invention provides a method of evaluating the dissolution quality of a binder solution for a secondary battery electrode, which includes: inputting a predetermined amount of binder solution to a pressure vessel; transferring the binder solution to a filter by supplying a pressure medium at a predetermined pressure to the pressure vessel; filtering the binder solution through the filter; and measuring at least one of a) and b) below with respect to the binder solution passing through the filter:

a) a cumulative filtration amount for a first period of time; and b) a flow rate reduction rate after a second period of time with respect to an initial flow rate.

In one example, the binder solution may be stored in and transferred from the pressure vessel in a system sealed from the outside until before the measurement of a) the cumulative filtration amount or b) the flow rate reduction rate.

In another example, the binder solution may be transferred to the filter along a pipe extending into the pressure vessel and having one end installed adjacent to a bottom of the pressure vessel.

The binder solution may be filtered through an in-line filter installed in series with the pipe.

In one example, a binder, which is a solute of the binder solution, may be one or more selected from the group consisting of polyvinylidene fluoride-co-hexafluoropropylene (PVDF-co-HFP), polyvinylidene fluoride (PVDF), polyacrylonitrile, polymethyl methacrylate, polyvinyl alcohol, carboxyl methyl cellulose (CMC), starch, hydroxypropyl cellulose, hydroxyethyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, polytetrafluoroethylene (PTFE), acrylonitrile-butadiene rubber, styrene-butadiene rubber (SBR), and acrylic rubber.

A solvent of the binder solution may be one or more organic solvents selected from among N-methyl pyrrolidone (NMP), dimethyl formamide (DMF), acetone and dimethyl acetamide, or water.

As a specific example, the binder solution may be a CMC solution in which a predetermined content of CMC is dissolved in water, or a PVDF solution in which a predetermined content of PVDF is dissolved in NMP.

In one example, the cumulative filtration amount for a first period of time may be a cumulative filtration amount for 10 minutes after filtering.

In one example, the flow rate reduction rate after a second period of time with respect to the initial flow rate may be a flow rate reduction rate after 2 hours with respect to the initial flow rate.

Still another aspect of the present invention provides a method of manufacturing an electrode slurry for a secondary battery, which includes: preparing a binder solution satisfying at least one of a1) and b1) according to a method for evaluating the dissolution quality of a binder solution for a secondary battery electrode; and manufacturing an electrode slurry by mixing an electrode active material and a conductive material with the binder solution:

a1) a predetermined amount or more of cumulative filtration amount for a first period of time; and b1) a predetermined value or less of flow rate reduction rate after the second period of time with respect to the initial flow rate.

Advantageous Effects

According to the present invention, the quality of an electrode for a secondary battery can be improved by preparing an electrode slurry with a binder solution having a predetermined amount or more of cumulative filtration amount or a predetermined value or less of flow rate reduction rate.

For example, the surface defect of an electrode can be improved by manufacturing the electrode slurry using a binder solution having a predetermined amount or more of cumulative filtration amount.

In addition, the viscosity of the electrode slurry can be decreased by manufacturing an electrode slurry with a binder solution having a predetermined value or less of flow rate reduction rate. In addition, the adhesive strength of an electrode produced with the electrode slurry can be enhanced.

BRIEF DESCRIPTION OF THE DRAWINGS

FIG. 1 is a configuration diagram showing a system for evaluating the dissolution quality of a binder solution for a secondary battery electrode.

FIG. 2 is a cross-sectional view of a filter, which is a component of the system.

FIG. 3 shows the number of impurities in a filter by applying an evaluation method using a conventional nylon mesh filter.

FIG. 4 is a graph showing a flow rate reduction rate of a binder solution filtered by the dissolution quality evaluation system of the present invention over time.

FIG. 5 is a graph showing the adhesive strength of an electrode produced by the method of preparing an electrode slurry of the present invention.

DETAILED DESCRIPTION OF THE PREFERRED EMBODIMENTS

Hereinafter, the present invention will be described in detail. Before this, terms and words used in the specification and claims should not be construed as being limited to general or dictionary terms meanings, and should be interpreted with the meaning and concept in accordance with the technical idea of the present invention based on the principle that the inventors have appropriately defined the concepts of terms in order to explain the invention in the best way.

In the specification, it should be understood that the term "comprise," "include" or "have" is intended to indicate the presence of a characteristic, number, step, action, component or part described in the specification, or a combination thereof, but does not preclude the possibility of the presence or addition of one or more characteristics, numbers, steps, actions, components, parts or a combination thereof. In addition, when a part of a layer, film, region or plate is disposed "on" another part, this includes not only a case in which one part is disposed "directly on" another part, but a case in which a third part is interposed therebetween. In contrast, when a part of a layer, film, region or plate is disposed "under" another part, this includes not only a case in which one part is disposed "directly under" another part, but a case in which a third part is interposed therebetween. In addition, in this application, "on" may include not only a case of disposed on an upper part but also a case of disposed on a lower part.

FIG. 1 is a configuration diagram showing a system for evaluating the dissolution quality of a binder solution for a secondary battery electrode.

A system 100 for evaluating the dissolution quality of a binder solution for a secondary battery electrode of the present invention includes a pressure vessel 10 accommodating a binder solution 1; a pressure medium source 20 supplying a pressure medium at a predetermined pressure to the pressure vessel 10; a filter 30 connected with the pressure vessel 10 by a pipe 12; and a flow rate measurement part 40 that measures at least one of a) and b) below of the binder solution passing through the filter 30 when the binder solution in the pressure vessel 10 is transferred to the filter and filtered by the pressure medium supplied to the pressure vessel 10.

a) a cumulative filtration amount for a first period of time; and b) a flow rate reduction rate after a second period of time with respect to an initial flow rate A binder, as a raw material for an electrode slurry for a secondary battery, serves to attach active materials to each other or an active material to the surface of a current collector and enhance the adhesive strength of a coated electrode. The binder is mixed with an electrode active material, conductive material in the form of a binder solution in which a binder solid content is dissolved in a predetermined solvent, thereby manufacturing an electrode slurry. However, when the binder included in the binder solution is left in the form of a fine undissolved material such as a microgel without being completely dissolved, the undissolved part may not perform the proper role of the binder. In this part, a surface defect of the electrode, such as gray spots, pinholes, or crater shapes, appears, and in severe cases, it becomes an active material defect area, and the adhesive strength of the electrode is degraded. In addition, the undissolved material increases the viscosity of an electrode slurry, adversely affecting the flowability of the slurry and impairing coatability when an electrode substrate is coated with the electrode slurry.

Therefore, while the dissolution quality of the binder solution for a secondary battery electrode is the major factor for improving an electrode surface defect, the coatability of an electrode slurry and electrode adhesion, conventionally, it was difficult to accurately determine the dissolution quality. In the present invention, before the production of an electrode slurry, to quantitatively evaluate the dissolution quality of the binder solution, a process of measuring a cumulative filtration amount for a first period of time and/or a flow rate reduction rate after a second period of time with respect to an initial flow rate, which were obtained by filtering the binder solution, and evaluating the dissolution quality with the measured values was introduced.

When there is a large amount of impurities or undissolved material in the binder solution, they are filtered through a filter and a flow rate through the filter is gradually reduced. When the binder solution is mixed well or impurities in the solution are pre-filtered before passing through the filter, the content of an undissolved material in the solution is decreased, thereby reducing the blockage of the filter and increasing a filtration amount. The cumulative filtration amount refers to a flow rate of the solution measured by accumulating the filtration amount of this solution for a certain period of time. As above, as a solution contains more undissolved materials, the cumulative filtration amount decreases, and as a solution contains less undissolved materials, the cumulative filtration amount increases. Therefore, the dissolution quality of the binder solution may be quantitatively evaluated by measuring the cumulative filtration amount. When the quality of the binder solution can be accurately evaluated with the cumulative filtration amount, a binder solution with excellent dissolution quality, which contains less undissolved materials, that is, a binder solution having a predetermined amount or more of cumulative filtration amount can be selected. Since the cumulative filtration amount is a parameter in which the filtration amount passing through the filter is accumulated over time, that is, a parameter indicating a change in flow rate over time, it is necessary to specify the time for accumulating the filtration amount. In the specification, the time for measuring the cumulative filtration amount refers to the "first period of time." When the "first period of time" is short, the dissolution quality of the binder solution may be rapidly determined.

In addition, the "predetermined amount or more of a cumulative filtration amount for a first period of time" used herein refers to the cumulative filtration amount of a binder solution that can produce an electrode slurry having desired quality. That is, the "predetermined amount or more of a cumulative filtration amount for a first period of time" refers to the cumulative filtration amount for specifying a binder solution having the dissolution quality that can contribute to the quality improvement of an electrode slurry. For example, when an electrode slurry is produced by mixing an electrode active material and a conductive material with a binder solution evaluated to have a predetermined amount or more of a cumulative filtration amount for a first period of time effective for improving a surface defect, the viscosity of the electrode slurry, or electrode adhesion, an excellent electrode with improved quality may be obtained.

Meanwhile, the flow rate reduction rate is also a parameter indicating a change in flow rate over time, like the cumulative filtration amount. In the present invention, the flow rate reduction rate refers to the ratio of a flow rate passing through a filter after a predetermined time to the initial flow rate passing through a filter. Therefore, as a solution contains more undissolved materials, the flow rate reduction rate increases, and as a solution contains less undissolved materials, the flow rate reduction rate decreases. The increase in cumulative filtration amount means a decrease in flow rate reduction rate of a solution passing through a filter over time. That is, the flow rate reduction rate has an inverse relationship with the cumulative filtration amount. The larger the cumulative filtration amount, the lower the flow rate reduction rate, and the smaller the cumulative filtration amount, the higher the flow rate reduction rate.

The cumulative filtration amount or flow rate reduction rate is a parameter indicating a change in flow rate over time, and when measured, may quantitatively evaluate the dissolution quality of a binder solution. The cumulative filtration amount or flow rate reduction rate may be selectively measured considering the type or characteristics of the solution or the time required for measurement. Particularly, when the flow rate reduction rate as well as the cumulative filtration amount are measured, the dissolution quality of the binder solution may be more accurately and comprehensively evaluated.

Since the flow rate reduction rate is a parameter that indicates a change in flow rate over time, it is necessary to specify the initial flow rate, the final flow rate, and the time for which the flow rate decreases. The "the time for which the flow rate decreases" used herein, that is, the time for measuring the flow rate reduction rate is referred to as the "second period of time." When the "second period of time" is short, the dissolution quality of the binder solution may be rapidly determined. In addition, the initial flow rate refers to the flow rate passing through a filter during an early predetermined time interval. For example, the flow rate of the solution passing through the filter for the first minute, that is, the initial flow rate per minute, may be defined as an initial flow rate. In addition, the final flow rate refers to the flow rate passing through a filter during a predetermined time interval after the second period of time. For example, when the second period of time is two hours, the flow rate per minute two hours after the measurement of an initial flow rate may be the final flow rate. The time interval may vary according to the type or characteristics of a solution.

In addition, the "predetermined level or less of flow rate reduction rate after a second period of time with respect to an initial flow rate" used herein refers to the flow rate reduction rate of a binder solution that can produce an electrode slurry having desired quality. That is, the predetermined level or less of flow rate reduction rate after a second period of time with respect to an initial flow rate refers to the flow rate reduction rate for specifying a binder solution having dissolution quality that can contribute to quality improvement of an electrode slurry. For example, when an electrode slurry is prepared by mixing an electrode active material and a conductive material with a binder solution evaluated to have a predetermined level or less of flow rate reduction rate effective for improving a surface defect, the viscosity of the electrode slurry, or electrode adhesion, an excellent electrode with improved quality may be obtained.

To accurately determine the dissolution quality of a binder solution, it is preferable that the cumulative filtration amount or flow rate reduction rate is accurately measured. When the binder solution is exposed to an external environment before and after a process of passing a binder solution through a filter to measure the cumulative filtration amount or flow rate reduction rate, impurities may be added from the outside. In this case, since not only an undissolved material in the binder solution but external impurities may be attached to the filter, it is difficult to accurately measure the cumulative filtration amount or flow rate reduction rate. Accordingly, in the system 100 for evaluating the dissolution quality of a binder solution according to one example of the present invention shown in FIG. 1, the binder solution is preserved and transferred from a vessel 10 in which a binder solution 1 is accommodated in a system sealed from the outside until before the measurement of the cumulative filtration amount and/or flow rate reduction rate.

As shown in FIG. 1, in one embodiment of the present invention, the binder solution 1 is accommodated in the pressure vessel 10 sealed from the outside. The pressure vessel 10 refers to a sealed vessel to which pressure is applied, and a vessel having pressure-resistant performance capable of withstanding a predetermined pressure. The pressure vessel 10 suffices, for example, if it has the ability to withstand a pressure even when the predetermined pressure is applied to the space in the pressure vessel. That is, the pressure vessel 10 in the system 100 is a vessel having airtightness and pressure resistance, and a vessel capable of accommodating a binder solution for a secondary battery. The capacity of the pressure vessel may be suitably selected within a range capable of accommodating an amount of a binder solution required for filtration. For example, a pressure vessel having a capacity of 20 kg or more or less may be used. The amount of binder solution accommodated in the pressure vessel may be suitably selected within the range of the capacity of the pressure vessel. The pressure vessel 10 may be filled with, for example, 1 to 5 kg of solution.

When the pressure vessel 10 is filled with the solution 1, by applying a constant pressure to the space above the solution, the solution in the pressure vessel 10 may be transferred to the outside. To this end, a supply line 22 capable of supplying a pressure medium from the outside, and a solution discharge pipe 12 connected with a filter 30 are connected to the pressure vessel 10. As an embodiment, the solution discharge pipe 12, as shown in FIG. 1, may extend into the pressure vessel 10, and an end of the pipe may be installed adjacent to the bottom of the pressure vessel. Therefore, a part 12a of the solution discharge pipe is immersed in the binder solution 1. As such, when the solution discharge pipe 12 is installed adjacent to the bottom of the pressure vessel 10, in the case in which the solution is pushed toward the filter by applying pressure to the upper space of the solution in the pressure vessel, there is an advantage in that most of the solution can be transferred to the filter 30 even when the level of the solution is lowered. An open/close valve 13 is installed in the solution discharge pipe 12 between the pressure vessel 10 and the filter 30. In addition, to measure the pressure in the pressure vessel 10, a pressure gauge 11 may be connected to the vessel and installed.

The application of pressure to the pressure vessel 10 is mediated by a pressure medium from a pressure medium source 20. As the pressure medium, dried air or inert gas that does not affect physical and chemical properties of the binder solution may be used. Particularly, in terms of management and production costs, nitrogen gas may be used as the pressure medium. The pressure medium source 20, for example, a nitrogen source, may be a high-pressure nitrogen tank. Nitrogen at a predetermined pressure is supplied to the pressure vessel through the supply line 22 from the pressure medium source 20. An open/close valve 21 for controlling the flow of the pressure medium may be installed in the supply line 22.

The pressure medium has a predetermined pressure that can transport the binder solution 1 in the pressure vessel to the filter 30, which is higher than the pressure in the pressure vessel 10. For example, when the pressure medium is nitrogen, nitrogen at a pressure of approximately 1 to 7 bar may be sent to the pressure vessel 10.

The filter 30 connected with the pressure vessel 10 by the pipe 12 is a so-called in-line filter continuously installed in series with the pipe. The in-line filter is a filter that is continuously installed by being connected to a pipe line, so the flow of a solution through the pipe line is continuously transferred to a subsequent pipe therethrough. Accordingly, by using the in-line filter 30, the binder solution passing through the pipes and the filter is not exposed to the outside, so there is an advantage that contamination caused by an external environment can be prevented during the filtration process for evaluating dissolution quality.

FIG. 2 is a cross-sectional view of a filter, which is a component of the system.

The filter 30 of FIG. 2 is an in-line filter, which includes a filter member 31, an elastic member 32 pressurizing the filter member 31, and a housing 33 accommodating the filter member 31 and the elastic member 32. The elastic member 32 serves to fix the filter member 31, and to prevent the leakage of a solution by bringing the filter member 31 in close contact with the housing. In addition, the filter 30 includes a gasket 34 for preventing the leakage of a solution. The front and rear ends of the filter 30 are coupled to the pipe. The pore size of the filter member 31 may vary considering the type of binder used, the flow rate of a solution, or the size of an undissolved material and the like. For example, an appropriate filter may be selected to have a pore size ranging from 0.5 to 100 µm. When the pore size is too large, the amount of sample required increases, and there is a risk that the undissolved material is not properly filtered and thus the dissolution quality cannot be accurately evaluated. When the pore size is small, it takes a long time for quality evaluation due to a low filtration speed. Considering these points, it is recommended to select a filter having an appropriate pore size.

The flow rate of the binder solution 1 filtered through the filter 30 is measured in the flow rate measurement part 40. The flow rate measurement part 40 may include an electronic scale 41 which measures the flow rate of the solution obtained by filtration, and a flow rate measurement unit 42 which measures (calculates) a cumulative filtration amount and/or a flow rate reduction rate from the flow rate measured by the electronic scale 41. The electronic scale 41 may use a scale that satisfies specifications of, for example, a minimum display of 0.1 g and a maximum display of 6 kg or more. A vessel, for example, a beaker is installed on the electronic scale 41, and the flow rate of the filtered binder solution dropping into the beaker may be measured.

The flow rate measurement part 40 may measure a cumulative filtration amount of the solution 1 filtered for a predetermined time. The cumulative filtration amount is a cumulative amount of the flow rate of the solution passing through a filter for a first period of time. For example, after passing through the filter, a cumulative filtration amount for 10 minutes (W10), a cumulative filtration amount for 20 minutes (W20), and a cumulative filtration amount for 30 minutes (W30) may be calculated, respectively. To shorten the dissolution quality evaluation time, the cumulative filtration amount (W10) is preferably used. However, according to the properties of the solution or binder, the dissolution quality may be evaluated with the cumulative filtration amount W20 or W30.

In addition, the flow rate measurement part 40 may measure the initial flow rate, and a flow rate reduction rate after a second period of time. The flow rate of the solution dropping into the beaker may be measured at regular time intervals and averaged to obtain a flow rate per second for a certain period of time. When the flow rate per second is obtained, a flow rate per minute (g/min) and an initial flow rate may be obtained. The initial flow rate may be an initial flow rate per minute. From this, the flow rate measurement unit 42 may measure the initial flow rate of the filtered solution 1 and the flow rate reduction rate after a second period of time.

The flow rate measurement unit 42 may include predetermined software that can automatically calculate a cumulative filtration amount for a first period of time and/or an initial flow rate, and a flow rate reduction rate after a second period of time.

A method of evaluating the dissolution quality of a binder solution for a secondary battery electrode according to the present invention includes: inputting a predetermined amount of binder solution to a pressure vessel; transferring the binder solution to a filter by supplying a pressure medium at a predetermined pressure to the pressure vessel; filtering the binder solution through the filter; and measuring at least one of a) and b) below with respect to the binder solution passing through the filter:

a) a cumulative filtration amount for a first period of time; and b) a flow rate reduction rate after a second period of time with respect to an initial flow rate By using a) and/or b), the dissolution quality of the binder solution may be evaluated.

For example, when a cumulative filtration amount for the same period of time for passing through a filter with the same pore size was measured, it can be evaluated that a solution with a larger cumulative filtration amount has better dissolution quality than a solution with a smaller cumulative filtration amount.

In addition, when a flow rate reduction rate after the same period of time for passing through a filter with the same pore size was measured, it can be evaluated that a solution with a low flow rate reduction rate has better dissolution quality than a solution with a high flow rate reduction rate.

By using the system and method for evaluating dissolution quality according to the present invention, the cumulative filtration amount and/or flow rate reduction rate of each binder solution is/are measured by repeating various tests by type and concentration of each binder solution, and thus the dissolution quality of the binder solution may be quantitatively evaluated.

In the step of measuring the cumulative filtration amount or flow rate reduction rate, the binder solution is preferably preserved and transferred from a vessel accommodating the binder solution in a system sealed from the outside until before measurement. To this end, the binder solution is preferably accommodated in the pressure vessel sealed from the outside, and the binder solution in the pressure vessel may be transferred to a filter along a pipe by applying a pressure medium at a predetermined pressure to the space in the pressure vessel. In this case, the binder solution may be transferred to a filter along the pipe extending into the pressure vessel and having an end installed adjacent to the bottom of the pressure vessel.

A binder, which is the solute of the binder solution, may be one or more selected from the group consisting of polyvinylidene fluoride-co-hexafluoropropylene) (PVDF-co-HFP), polyvinylidene fluoride (PVDF), polyacrylonitrile, polymethyl methacrylate, polyvinyl alcohol, carboxyl methyl cellulose (CMC), starch, hydroxypropyl cellulose, regenerated cellulose, polyvinylpyrrolidone, tetrafluoroethylene, polyethylene, polypropylene, polyacrylic acid, ethylene-propylene-diene monomer (EPDM), sulfonated EPDM, polytetrafluoroethylene (PTFE), acrylonitrile-butadiene rubber, styrene-butadiene rubber (SBR), and acrylic rubber.

In addition, a solvent of the binder solution may be one or more organic solvents selected from N-methyl pyrrolidone (NMP), dimethyl formamide (DMF), acetone and dimethyl acetamide, or water.

As a specific example, the binder solution may be a CMC solution in which a predetermined content of CMC is dissolved in water. The CMC solution is mainly used as a binder solution for a negative electrode slurry.

As another example, the binder solution may be a PVDF solution in which a predetermined content of PVDF is dissolved in NMP. The PVDF solution is mainly used as a binder solution for a positive electrode slurry.

The system and method for evaluating dissolution quality according to the present invention may be used to evaluate the dissolution quality of a binder solution for a positive electrode or negative electrode.

Meanwhile, a method of manufacturing an electrode slurry for a secondary battery includes;

preparing a binder solution satisfying at least one of the following conditions a) and b) according to the method of evaluating the dissolution quality of the binder solution for a secondary battery electrode; and manufacturing an electrode slurry by mixing an electrode active material and a conductive material with the binder solution.

a1) a predetermined amount or more of a cumulative filtration amount for a first period of time; and b1) a predetermined value or less of flow rate reduction rate after a second period of time with respect to the initial flow rate.

That is, according to the method of preparing an electrode slurry, the dissolution quality of a corresponding binder solution may be evaluated by measuring a cumulative filtration amount for a first period of time and a flow rate reduction rate after a second period of time, for example, by the dissolution quality evaluation system of FIG. 1. Accordingly, from the binder solutions whose dissolution quality has been evaluated, a high-quality binder solution having a predetermined amount or more of cumulative filtration amount and/or a predetermined value or less of flow rate reduction rate may be selected (prepared).

An electrode slurry may be prepared by mixing an electrode active material and a conductive material with the high-quality binder solution, thereby improving the quality characteristics of the electrode slurry.

The electrode active material may include a predetermined positive electrode active material and negative electrode active material. The positive electrode active material may be a lithium-containing oxide, which may be a lithium-containing transition metal oxide.

For example, the lithium-containing transition metal oxide may be any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\leq y<1$), $Li_xNi_{1-y}Mn_yO_2$ ($0.5<x<1.3$, $0\leq y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$), or a mixture of two or more thereof. In addition, the lithium-containing transition metal oxide may be coated with a metal such as aluminum (Al) or a metal oxide thereof. In addition, other than the lithium-containing transition metal oxide, one or more of a sulfide, a selenide and a halide may be used.

The negative electrode active material may include a carbon material, lithium metal, silicon or tin. When a carbon material is used as a negative electrode active material, it may be either low crystalline carbon or high crystalline carbon. Representative examples of the low crystalline carbon include soft carbon and hard carbon, and representative examples of the high crystalline carbon include high-temperature calcined carbon such as natural graphite, Kish graphite, pyrolytic carbon, mesophase pitch-based carbon fiber, mesocarbon microbeads, mesophase pitches and petroleum or coal tar pitch derived cokes.

The conductive material is not particularly limited as long as it has conductivity without causing a chemical change in the battery, and examples of the conductive material may include graphite such as natural graphite or artificial graphite; carbon black such as acetylene black, Ketjen black, channel black, furnace black, lamp black, or thermal black; a conductive fiber such as carbon fiber or metal fiber; carbon fluoride; a metal powder such as carbon fluoride, aluminum, nickel powder; a conductive whisker such as zinc oxide or potassium titanate; a conductive metal oxide such as titanium oxide; or a conductive material such as a polyphenylene derivative.

The electrode slurry may be a positive electrode slurry or a negative electrode slurry.

Hereinafter, examples will be provided to specifically explain the present invention, but the present invention is not limited to the following examples.

Comparative Example 1

1.3% CMC solution was prepared by adding a certain amount of CMC to distilled water. A pitched paddle was selected as a mixer blade, and stirring was performed by changing a mixing time. To compare dissolution quality, before measuring a cumulative filtration amount, CMC solutions were prepared by being previously filtered through a filter with a pore size of 50 or 30 μm or without any filtration.

For the CMC solutions prepared as above, dissolution quality was evaluated by a conventional evaluation method. That is, the result of visually observing the number of impurities on a film after each CMC solution was applied to a 5×5 cm OHP film to a thickness of 200 μm using a doctor blade is shown below. The number after "+" in Table 1 indicates a deviation when the number of impurities by different observers according to a conventional method.

TABLE 1

| Mixing time (min) | Whether filtered or not | Micro gel (number) |
| --- | --- | --- |
| 60 | x | 40 ± 10 |
| 60 | 50 μm | 35 ± 10 |
| 120 | x | 35 ± 5 |
| 120 | 50 μm | 20 ± 5 |
| 180 | x | 25 ± 5 |
| 180 | 50 μm | 15 ± 5 |
| 240 | x | 5 ± 3 |
| 240 | 30 μm | 7 ± 2 |

As shown in Table 1, as the mixing time increased, the number of impurities tends to be reduced. However, when the mixing time is 240 minutes, the filtered solution rather has a larger number of impurities. In addition, as shown above, since there is a deviation depending on an observer and thus the number of measured impurities is not constant, it was not possible to accurately and quantitatively evaluate the dissolution quality of the CMC solution.

Example 1

1.3% CMC solution was prepared by mixing and filtration under the same conditions as in Comparative Example 1.

The prepared CMC solution was filtered using a system shown in FIG. 1 to measure a cumulative filtration amount for 10 minutes (W10). An in-line filter used to measure a cumulative filtration amount is an F1 series in-line filter (produced by Hy-Lok Co., Ltd.), and the filter member used herein is a stainless depth filter. The in-line filter used herein has a pore size of 10 μm. A flow rate of the filtered solution was measured with an electronic scale (GP30K electronic scale, AND), and the resulting of measuring a cumulative filtration amount for 10 minutes was compared with that of Comparative Example 1.

TABLE 2

| Mixing time (min) | Whether filtered or not | Micro gel (number) | Cumulative filtration amount (g) |
|---|---|---|---|
| 60 | x | 40 ± 10 | 454 |
| 60 | 50 μm | 35 ± 10 | 585 |
| 120 | x | 35 ± 5 | 681 |
| 120 | 50 μm | 20 ± 5 | 834 |
| 180 | x | 25 ± 5 | 907 |
| 180 | 50 μm | 15 ± 5 | 1020 |
| 240 | x | 5 ± 3 | 1408 |
| 240 | 30 μm | 7 ± 2 | 1700 |

As shown in Table 2, as the mixing time increased, a cumulative filtration amount increased. In addition, such tendency appears in a very quantitative manner, and there is no deviation depending on an observer. Therefore, it can be seen that the dissolution quality of a binder solution for a secondary battery electrode can be accurately and quantitatively evaluated with a cumulative filtration amount for a first period of time (10 minutes).

Example 2

To evaluate the defect characteristics of an electrode surface according to the cumulative filtration amount (dissolution quality) of a CMC solution, CMC solutions of the same concentration (1.3%), which have different cumulative filtration amounts, were prepared. The CMC solutions were prepared to have different cumulative filtration amounts by whether or not to pre-filter, and by adjusting dissolution time.

A negative electrode slurry was manufactured by preparing graphite as a negative electrode active material, carbon black as a conductive material and a CMC solution as a binder, adding the graphite and the conductive material to the CMC solution in which the amount of a solvent (water) was adjusted so that a weight ratio of the active material, the conductive material and the binder was 98:1:1 and a solid content including the active material, the conductive material and the binder was 40%, and mixing the resultant using a TK mixer at 60 rpm for 1 hour. A negative electrode was manufactured by coating one surface of a copper current collector with the manufactured negative electrode slurry under specific coating conditions (coating width: 200 mm, coating speed: 5 m/min, and load amount: 300 mg/cm$^2$), drying the resultant at 100° C. and rolling it.

By the above-described method, negative electrodes of the same composition were produced with CMC solutions with different cumulative filtration amounts, and the result of measuring the number of surface defects is shown in Table 3.

TABLE 3

| Type | W10 = 454 g | W10 = 1020 g | W10 = 1408 g | W10 = 1700 g |
|---|---|---|---|---|
| A | 1231 | 534 | 364 | 193 |
| B | 30 | 25 | 10 | 3 |
| C | 11 | 3 | 1 | 0 |

In Table 3, the surface defects were evaluated by classification into A, B and C types according to the shape and size of surface defects. Type A is a case with a gray spot unlike a normal negative electrode surface, Type B is a case of a crater or pinhole shape having a width of 5 mm or less, and Type C is a case of a crater or pinhole shape having a width of more than 5 mm. The number of surface defects of a negative electrode with a total length of 50 m was visually confirmed.

As shown in Table 3, it can be seen that, as the cumulative filtration amount for 10 minutes (W10) increases, the number of surface defects on the negative electrode is reduced. Particularly, since the Type C surface defects have a greater effect on the degradation of battery performance than other types, the surface should be carefully managed so as not to have such defects thereon. When there is a Type C surface defect, a vacancy is generated in the active material layer in the region corresponding to the defect, and the capacity of the battery decreases and the resistance increases as much as the empty area. Therefore, the dissolution quality of the binder solution (CMC solution) should be managed so that W10 is 1400 g or more.

While Examples 1 and 2, which are described above, exemplify a binder solution for a negative electrode and a negative electrode, the dissolution quality for a binder solution for a positive electrode and a positive electrode is also evaluated with a cumulative filtration amount so that the quality (e.g., surface defects) of the positive electrode can be improved.

From the above results, it can be seen that dissolution quality was evaluated with the cumulative filtration amount of a binder solution, and it is possible to predict and manage the surface defects of an electrode (negative or positive electrode) by preparing an electrode slurry (negative electrode or positive electrode slurry) with a binder solution having a specific cumulative filtration amount or more identified from the evaluated quality.

Comparative Example 2

An 8% PVDF solution was manufactured by adding a certain amount of PVDF to an NMP solvent and mixing the resulting mixture using a homogenizer for 4 hours. PVDF solutions of Comparative Example 2 (Comparative Example 2-1 and Comparative Example 2-2) were manufactured by using the same mixing conditions except that the mixing temperatures were set to 70° C. and 50° C., respectively.

The prepared PVDF solutions were filtered by a conventional evaluation method, that is, through a nylon mesh filter to observe the number of impurities in the filter.

FIG. 3 shows the number of impurities in the filter by applying a conventional nylon mesh filtering evaluation method. FIG. 3A shows the numbers of impurities measured for Comparative Example 2-1 with a mixing temperature of 70° C., and FIG. 3B shows the number of impurities measured for Comparative Example 2-2 with a mixing temperature of 50° C. Since all other preparation conditions for the binder solution were the same except a mixing temperature, it is expected that the number of impurities in Comparative Example 2-1 that is mixed at a higher temperature will be smaller. However, as shown in FIG. 3, the number of impurities in Comparative Example 2-1 shown in FIG. 3A is 28, and the number of impurities of Comparative Example 2-2 shown in FIG. 3B is 21, showing that the number of impurities of Comparative Example 2-1 that is mixed at a higher temperature is larger.

From this, it can be seen that it is difficult to quantitatively evaluate the dissolution quality of the binder solution because it is not possible to determine which solution is defective or the binder solution is good or bad by the conventional nylon mesh filtering evaluation method.

Example 3 and Comparative Example 3

Flow rate reduction rates (%) were measured by filtering the solutions of Comparative Examples 2-1 and 2-2 using the system shown in FIG. 1, and set as Example 3 and Comparative Example 3-1, respectively. In addition, another PVDF solution prepared under same mixing conditions with the same mixing temperature (50° C.) as Comparative Example 2-2 was set as Comparative Example 3-2, and their flow rate reduction rates were also measured.

An in-line filter used to measure a flow rate reduction rate is an F1 series in-line filter (Hy-Rok, Co., Ltd.), and the used filter member is a stainless depth filter. The pore size of the in-line filter used herein is 2 µm. The flow rate of the filter solution was measured using an electronic scale (GP30K electronic scale, AND), and the result of measuring a flow rate reduction rate over time is shown in the graph of FIG. 4.

As shown in FIG. 4, it can be seen that a reduction in flow rate (flow rate reduction rate) over time is very small compared to the initial flow rate of Example 3 filtered using the sealed in-line filter system after being mixed at 70° C. The initial flow rate of Example 3 is 5.71 g, but the flow rate after two hours is approximately 5.20 g in FIG. 4A, at which approximately 91% of the initial flow rate is maintained, and the flow rate reduction rate is only 9%. The flow rate of the PVDF solution of Example 3 then gradually decreases, and thus even after 10 hours, is 88% of the initial flow rate, and the flow rate reduction rate is only 12%. Therefore, the binder solution of Example 3 has a very low flow rate reduction rate and thus can be determined as good. Considering the test time, it is possible to determine overall quality with a flow rate reduction rate after two hours with respect to the initial flow rate. That is, like Example 3, a solution in which the flow rate reduction rate after two hours with respect to the initial flow rate is 10% or less may be determined as having good quality. However, depending on the type of solution, mixing conditions, or desired characteristics of an electrode, the time and % value for determining a flow rate reduction rate may vary. For example, the flow rate reduction rates after 4, 6 and 8 hours of filtering may also be criteria for determining the dissolution quality of a binder solution. In addition, a rate at which the initial flow rate is reduced to 80% of the initial flow rate, that is, a flow rate reduction rate of 20%, may be a criterion for determining the dissolution quality. Therefore, as a criterion for a good binder solution, like the solution of Example 3, despite the passage of time, a solution having a flow rate reduction rate that does not exceed 20% may be defined as a good quality solution.

Meanwhile, the solution of Comparative Example 3-1 has an initial flow rate of 4.28, a flow rate after 2 hours of 0.80, resulting in a flow rate reduction rate of 82%. In addition, after 10 hours of passing through a filter, the filter is clogged with an undissolved material, so the solution hardly flows.

The solution of Comparative Example 3-2 also has an initial flow rate of 4.96, but has a flow rate after two hours of 1.90, resulting in a flow rate reduction rate of 62%. Even after 10 hours of filtering, the solution of Comparative Example 3-2 hardly flows since the filter is clogged by an undissolved material. Therefore, the solutions of Comparative Examples 3-1 and 3-2 may be determined as having poor quality.

From the above, it can be seen that when the dissolution quality of the solution is evaluated by a flow rate reduction rate according to the method of the present invention, the dissolution quality of the binder solution for a secondary battery can be quantitatively evaluated.

Example 4 and Comparative Example 4 To evaluate the quality characteristics of an electrode slurry according to the flow rate reduction rate (dissolution quality) of a PVDF solution, PVDF solutions of Example 3, and Comparative Examples 3-1 and 3-2, which have the same concentrations and different flow rate reduction rates, were prepared at different mixing temperatures 70° C., 50° C. and 50° C.

A positive electrode slurry was manufactured by preparing Li[Ni$_{0.6}$Mn$_{0.2}$Co$_{0.2}$]O$_2$ as a positive electrode active material, carbon black as a conductive material, and a PVDF solution as a binder, adding the active material and the conductive material to the PVDF solution in which a solvent (NMP) amount was adjusted so that a weight ratio of the active material, the conductive material and the binder was 96.5:1.5:2, and a solid content including the active material, the conductive material and the binder was 65%, and mixing the resultant with a homogenizer for 1 hour. A positive electrode was manufactured by coating, drying, and pressing the slurry on an aluminum foil having a thickness of 20 µm.

According to the above-described method, a positive electrode slurry with the same composition and a positive electrode were manufactured with each of the PVDF solutions of Example 3, Comparative Examples 3-1 and 3-2, which have different flow rate reduction rates after two hours with respect to the initial flow rate. The positive electrode slurry and the positive electrode prepared with the PVDF solution of Example 3 were set as Example 4, the positive electrode slurries and the positive electrodes prepared with the PVDF solutions of Comparative Examples 3-1 and 3-2 were set as Comparative Examples 4-1 and 4-2, respectively. The results of measuring the viscosities of the positive electrode slurries and the adhesive strengths of the corresponding positive electrodes of Examples and Comparative Examples are shown in Table 4 below and FIG. 5.

TABLE 4

| Positive electrode/positive electrode slurry | Example 4 | Comparative Example 4-1 | Comparative Example 4-2 |
|---|---|---|---|
| Viscosity of slurry (cps) | 19,516 | 20,805 | 23,906 |
| Adhesive strength (gf/20 mm) | 46.9 | 34.9 | 32.3 |

The viscosities were measured using a Brookfield viscometer (model name: LVDV2T) at 25° C. and a shear rate of 12 rpm.

The adhesive strength of the positive electrode was measured by cutting the positive electrode to a size of 15 cm×2 cm, adhering a coating surface of the active material layer of the positive electrode to a slide glass attached with a double-sided tape, and measuring a force (gf/mm; peel strength) at which the tape detached from the sample by pulling one end of a sample positive electrode using a universal testing machine (UTM) at a rate of 100 mm/min and a peeling angle of 90 degrees.

As shown in Table 4, it can be seen that the viscosities of Comparative Examples 4-1 and 4-2, which are positive electrode slurries prepared with the binder solution mixed at 50° C., increased by 6.6% and 22%, respectively, compared to the viscosity of the binder solution of Example 4 mixed at 70° C.

In addition, it can be seen that the adhesive strengths of the positive electrodes of Comparative Examples 4-1 and 4-2 decreased by 26% and 31%, respectively, compared to that of the positive electrode of Example 4 prepared with the binder solution mixed at 70° C. That is, since Example 4 relates to a positive electrode prepared with a good quality binder solution (Example 3-1) having a flow rate reduction rate after a second period of time (2 hours) of 10% or less, compared to the initial flow rate, the electrode quality is excellent. That is, the viscosity of the electrode slurry of Example 4 was relatively low, but electrode adhesion was excellent. On the other hand, it is expected that the viscosities of the positive electrode slurries of Comparative Examples 4-1 and 4-2 prepared with the binder solutions of Comparative Examples 3-1 and 3-2, which have high flow rate reduction rates after 2 hours, are increased to lower the flowability of the electrode slurry, resulting in poor coatability. In addition, it can be seen that the adhesive strengths of the positive electrodes prepared with the positive electrode slurries of Comparative Examples 4-1 and 4-2 are also significantly lowered compared to Example 4.

Meanwhile, since Comparative Examples 4-1 and 4-2 were prepared with binder solutions mixed under the same temperature conditions, it is difficult to determine which binder solution has good quality or which solution can produce a good electrode (slurry) only by the temperature condition. However, as described above, in the present invention, the dissolution quality of the solution may be quantitatively evaluated with a flow rate reduction rate. Therefore, it can be seen that even the binder solutions prepared under the same temperature conditions can be used not only to quantitatively evaluate the dissolution quality thereof but to predict and manage the quality characteristics of the electrode (slurry) prepared therewith.

While the above-described Examples 3 and 4 are examples regarding a binder solution for a positive electrode and a positive electrode, the dissolution quality for a binder solution for a negative electrode and a negative electrode may also be evaluated with a flow rate reduction rate to improve the quality (e.g., viscosity or electrode adhesion, etc.) of a negative electrode.

From the above results, it can be seen that, by preparing an electrode slurry (negative electrode or positive electrode slurry) with a binder solution having a specific flow rate reduction rate or less which has been determined by evaluating the dissolution quality with the flow rate reduction rate of a binder solution, the surface defects of an electrode (negative electrode or positive electrode) can be predicted and managed.

In addition, the cumulative filtration amount and the flow rate reduction rate of a binder solution may be simultaneously measured to more comprehensively evaluate the dissolution quality of the corresponding solution. That is, when both parameters are excellent, the binder solution can be evaluated having the best quality. In addition, a binder solution that has reached the target value for only one of the two parameters can be evaluated as a binder solution that can be used normally. A binder solution in which both of the two parameters fall short of the target value can be evaluated as a binder solution unsuitable for producing an electrode even when it can have good quality as evaluated by the conventional evaluation method.

Therefore, according to the system for evaluating the dissolution quality of a binder solution for a secondary battery electrode and the evaluation method of the present invention, it is possible to increase the discriminating power of the binder solution quality evaluation.

As above, the present invention has been described in further detail with reference to the accompanying drawings and the above-described examples. However, since the configurations of the examples described herein are merely provided as the most preferable examples and do not represent all of the technical spirit of the present invention, it should be understood that there may be various equivalents and modifications that can replace them at the time of filing the present application.

DESCRIPTION OF REFERENCE NUMERALS

1: binder solution
10: pressure vessel
11: pressure gauge
12: solution discharge pipe
12a: part of pipe
13: open/close valve
20: pressure medium source
21: pressure medium open/close valve
22: pressure medium supply line
30: in-line filter
31: filter member
32: elastic member
33: housing
34: gasket
40: flow rate measurement part
41: electronic scale
42: flow rate measurement unit

The invention claimed is:

1. A system for evaluating dissolution quality of a binder solution for a secondary battery electrode, comprising:
    a pressure vessel accommodating the binder solution;
    a pressure medium source supplying a pressure medium at a predetermined pressure to the pressure vessel;
    a filter connected with the pressure vessel by a pipe; and
    a flow rate measurement part that measures at least one of a) or b) with respect to the binder solution passing through the filter when the binder solution in the pressure vessel is transferred to the filter by the pressure medium supplied to the pressure vessel and filtered:
    a) a cumulative filtration amount of the binder solution for a first period of time; and
    b) a flow rate reduction rate of the binder solution after a second period of time with respect to an initial flow rate.

2. The system of claim 1, wherein the pipe extends into the pressure vessel and an end of the pipe is installed adjacent to a bottom of the pressure vessel.

3. The system of claim 1, wherein the filter is an in-line filter installed in series with the pipe.

4. The system of claim 3, wherein the in-line filter comprises a filter member, an elastic member that pressurizes the filter member, and a housing accommodating the filter member and the elastic member.

5. A method for evaluating dissolution quality of a binder solution for a secondary battery electrode, comprising:
    inputting a predetermined amount of the binder solution to a pressure vessel;

transferring the binder solution to a filter by supplying a pressure medium at a predetermined pressure to the pressure vessel;

filtering the binder solution through the filter; and measuring at least one of a) or b) with respect to the binder solution passing through the filter:

a) a cumulative filtration amount of the binder solution for a first period of time; and b) a flow rate reduction rate of the binder solution after a second period of time with respect to an initial flow rate.

6. The method of claim 5, wherein the binder solution is stored in and transferred from the pressure vessel in a system sealed from outside until before the measurement of a) the cumulative filtration amount or b) the flow rate reduction rate.

7. The method of claim 6, wherein the binder solution is transferred to the filter along a pipe extending into the pressure vessel and having one end installed adjacent to a bottom of the pressure vessel.

8. The method of claim 7, wherein the binder solution is filtered through an in-line filter installed in series with the pipe.

9. The method of claim 5, wherein a binder, which is a solute of the binder solution, includes one or more selected from the group consisting of polyvinylidene fluoride-co-hexafluoropropylene (PVDF-co-HFP), polyvinylidene fluoride (PVDF), polyacrylonitrile, polymethyl methacrylate, polyvinyl alcohol, carboxyl methyl cellulose (CMC), starch, hydroxypropyl cellulose, hydroxyethyl cellulose, regenerated cellulose, polyvinylpyrrolidone, tetrafluoroethylene, polyethylene, polypropylene, polyacrylic acid, ethylene-propylene-diene monomer (EPDM), sulfonated EPDM, polytetrafluoroethylene (PTFE), acrylonitrile-butadiene rubber, styrene-butadiene rubber (SBR), and acrylic rubber.

10. The method of claim 5, wherein a solvent of the binder solution includes one or more organic solvents selected from N-methyl pyrrolidone (NMP), dimethyl formamide (DMF), acetone and dimethyl acetamide, or water.

11. The method of claim 5, wherein the binder solution includes a carboxyl methyl cellulose (CMC) solution in which a predetermined content of the carboxyl methyl cellulose (CMC) is dissolved in water.

12. The method of claim 5, wherein the binder solution includes a polyvinylidene fluoride (PVDF) solution in which a predetermined content of the polyvinylidene fluoride (PVDF) is dissolved in N-methyl pyrrolidone (NMP).

13. The method of claim 5, wherein the cumulative filtration amount for a first period of time is a cumulative filtration amount of the binder solution for 10 minutes after filtering.

14. The method of claim 5, wherein the flow rate reduction rate after a second period of time with respect to the initial flow rate is a flow rate reduction rate of the binder solution after 2 hours with respect to the initial flow rate.

15. A method of manufacturing an electrode slurry for a secondary battery, comprising:

preparing a binder solution satisfying at least one of a1) or b1) according to the method for evaluating the dissolution quality of the binder solution for the secondary battery electrode of claim 5; and manufacturing the electrode slurry by mixing an electrode active material and a conductive material with the binder solution:

a1) a predetermined amount or more of the cumulative filtration amount for the first period of time; and b1) a predetermined value or less of the flow rate reduction rate after the second period of time with respect to the initial flow rate.

16. The method of claim 5, comprising measuring only the cumulative filtration amount.

17. The method of claim 5, comprising measuring only the flow rate reduction rate.

18. The method of claim 5, comprising measuring both the cumulative filtration amount and the flow rate reduction rate.

19. The method of claim 5, wherein the first period of time is 10 minutes, 20 minutes, or 30 minutes.

20. The method of claim 7, wherein at least a part of the pipe is immersed in the binder solution.

* * * * *